Figure 1:
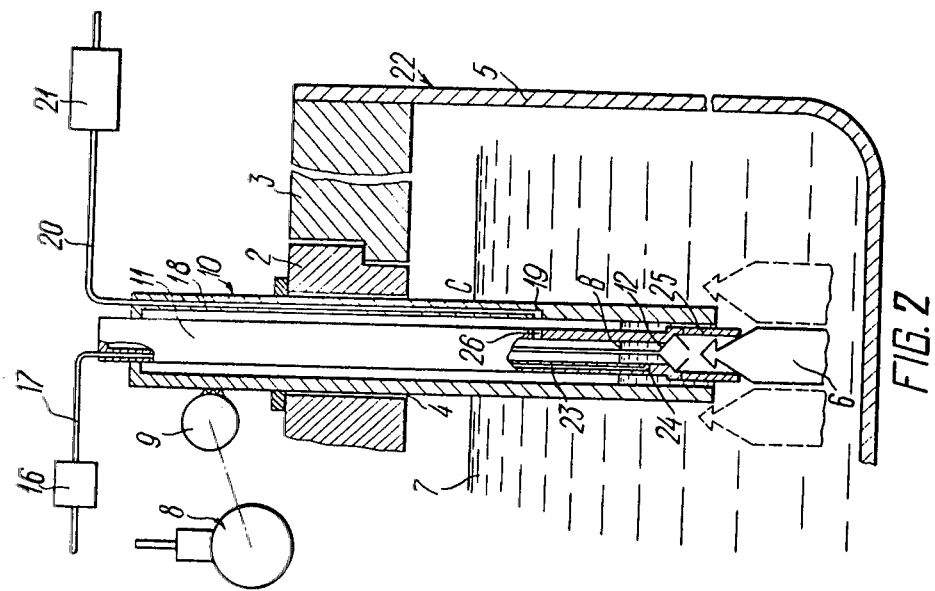

United States Patent

Zhuchkov et al.

[11] 3,947,318
[45] Mar. 30, 1976

[54] LIQUID-METAL-COOLED REACTOR

[76] Inventors: Ivan Ilich Zhuchkov, ulitsa 22 Partsiezda, 6/2, kv. 60, Gorky; Viktor Sergeevich Filonov, ulitsa Raspletina, 1, kv. 19, Moscow; Boris Ivanovich Zaitsev, ulitsa Shalyapina, 15, kv. 131, Gorky; Lev Nikolaevich Artemiev, ulitsa Generala Zimina, 9, kv. 3, Gorky; Vladimir Vildanovich Rakhimov, prospekt Lenina, 28, korpus 13, kv. 16, Gorky, all of U.S.S.R.

[22] Filed: Nov. 1, 1973

[21] Appl. No.: 411,816

[52] U.S. Cl. ............................ 176/19 R; 176/19 LD
[51] Int. Cl.² ........................................ G21C 17/06
[58] Field of Search ..................... 176/19 R, 19 LD

[56] References Cited
UNITED STATES PATENTS

| | | |
|---|---|---|
| 3,073,767 | 1/1963 | Whitham et al. ............... 176/19 LD |
| 3,234,101 | 2/1966 | Berthod ......................... 176/19 LD |

OTHER PUBLICATIONS

Nucleonics, Vol. 19, No. 7, July 1961, Locating Farled Fuel in Water Reactors, by R. N. Osborne, pp. 84, 86, 89.

Primary Examiner—Harvey E. Behrend
Attorney, Agent, or Firm—Haseltine, Lake & Waters

[57] ABSTRACT

A liquid-metal-cooled reactor comprising two rotatable plugs, one of them, having at least one hole, being arranged internally of the other, a recharging mechanism with a guide tube adapted to be moved through the hole of the first plug by means of a drive, and a device for detecting stacks with leaky fuel elements, the recharging mechanism tube serving as a sampler.

3 Claims, 2 Drawing Figures

LIQUID-METAL-COOLED REACTOR

The present invention relates to nuclear engineering, and more particularly to a liquid-metal-cooled reactor.

Known in the art are liquid-metal-cooled reactors comprising two rotatable plugs, the first plug having at least one hole and being arranged internally of the second, a recharging mechanism with a guide tube adapted to move through the hole of the first plug with the aid of a drive and accommodating a rod provided with means for gripping a fuel element stack and removing it from the reactor core into the guide tube. These reactors are also provided with a device for detecting stacks with leaky fuel elements, comprising a sampler to withdraw coolant samples from each individual fuel element stack, with an inert carrier gas being fed under pressure to the sampler, and having an inner space wherein a coolant sample is degassed and which communicates with a device for measuring the radioactivity of the inert carrier gas and of the gases evolved from the coolant sample, evacuated from the sampler.

A disadvantage inherent in such a liquid-metal-cooled reactor, comprising a device for detecting stacks with leaky fuel elements resides in the complexity of the design of the sampler of the device for detecting stacks with leaky fuel elements, which sampler is made in the form of a collector with intricate piping arranged inside the reactor. This complicates the recharging of the fuel element stacks, which involves dismantling of the whole installation. The reactor is thus rendered difficult to operate, with additional time required to check faulty fuel element stacks, and the risk of exposure to radioactive matter contaminating the equipment inside the reactor involved.

It is an object of the invention to provide a liquid-metal-cooled reactor allowing consecutive checks of all fuel element stacks without removing them from the reactor core, upon stopping the reactor, and, at the same time, to remove faulty stacks from the core.

With this and other objects in view, the present invention relates to a liquid-metal-cooled reactor comprising two rotatable plugs, one plug having at least one hole and being arranged internally of the other, a recharging mechanism with a guide tube for moving through the hole of the first plug and accommodating a rod with means for gripping a fuel element stack and removing it from the core into the guide tube, and a device for detecting stacks with leaky fuel elements, provided with a sampler to withdraw coolant samples from individual fuel elements, which sampler is adapted to receive inert carrier gas fed thereto under pressure and to degas a coolant sample, the inner space of the sampler communicating with means for measuring the radioactivity of the inert carrier gas and of the gases evolved from the coolant sample, both evacuated from the sampler.

According to the invention, the guide tube of the recharging mechanism is used as the sampler, together with means for introducing the inert carrier gas, and means for evacuating the inert carrier gas together with the gases evolved from the coolant sample.

It is recommended that the wall of the guide tube of the recharging mechanism be provided with a duct for removing the inert carrier gas together with the gases evolved from the coolant sample, which duct communicates with the inner space of the guide tube through a hole made in the guide tube wall, above the coolant level, and a duct for feeding the inert carrier gas into the tube, which duct also communicates with the inner space of the guide tube through a hole made in the that wall, level with the bottom end of the fuel element stack, transferred from the core to the tube.

It is alternatively also suggested that a duct be provided in the wall of the rod with the gripper for feeding the inert carrier gas into the tube, which duct communicates with the inner space of the rod through a hole in the proximity to the end face of the rod, fitted on the bottom end whereof is a sealing member intended to shut off the coolant flow from the fuel element stack, as well as at least one hole made in the rod above the coolant level in the guide tube to evacuate the inert carrier gas together with the gases evolved from the coolant sample.

Figure 2:
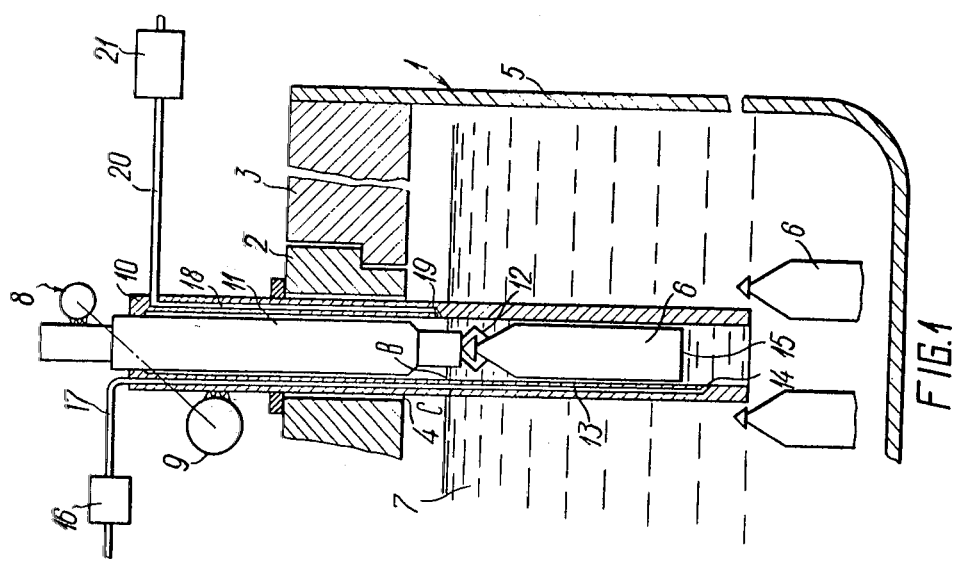

Other objects, advantages and features of the invention will become evident from the following description of preferred embodiments thereof taken in conjunction with the accompanying drawings, wherein:

FIG. 1 is an elevational view of a liquid-metal-cooled reactor, according to the invention; and FIG. 2 is an elevational view of another embodiment of the liquid-metal-cooled reactor, according to the invention.

Referring now to FIG. 1, the inventive liquid-metal-cooled reactor 1 comprises two rotatable plugs 2 and 3, one of them /plug 2/ being arranged in the other /plug 3/ and having a hole 4. The plug 2 may be provided with additional holes. The reactor 1 also comprises a housing 5, a cover /not shown/, a core with fuel element stacks 6 washed by a coolant 7, and a recharging mechanism 8 with a guide tube 10 adapted to move through the hole 4 of the rotating plug 2 with the aid of a plug 9. The guide tube 10 accommodates a rod 11 with a gripper 12 for gripping the stack 6 and removing it from the core into the guide tube 10.

The reactor 1 further comprises a device for detecting stacks 6 with leaky fuel elements. The guide tube 10 serves as a sampler in the detecting device, which makes for consecutive sampling of the coolant from each stack 6. Provided in the wall of the guide tube 10 is a duct 13 for feeding an inert carrier gas into the sampler which duct communicates with the inner space of the guide tube 10 through a hole 14 made in the wall of the tube 10 level with the bottom end 15 of the stack 6 transferred from the core of the reactor 1 into the tube 10.

The duct 13 for feeding the inert carrier gas also communicates with a doser 16 of a known design through a pipe 17. A duct 18 for evacuating the inert carrier gas together with the gases evolved from a coolant sample from the sampler is provided in the wall of the guide tube 10 and communicates with the inner space thereof through a hole 19 made in the wall of the tube 10 above level B of the coolant 7 in the tube 10 /C is the coolant level in the vessel of the reactor 1/. The other outlet of the duct communicates through a pipe 20 with means 21 for measuring the radioactivity of the outgoing gases, preferably in the form of a conventional instrument for measuring the concentration of a radioactive gas.

Turning now to FIG. 2, the modified inventive reactor 22, as compared to the reactor 1 of FIG. 1, comprises a duct 23 for feeding the inert carrier gas provided in the wall of the rod 11 and communicating with the inner space thereof through a hole 24 made in